United States Patent [19]

Provol

[11] Patent Number: 5,254,144
[45] Date of Patent: Oct. 19, 1993

[54] METHOD AND APPARTUS FOR SEPARATING PARTICULATE MATERIAL FROM COMBUSTIBLE GASES

[75] Inventor: Steven J. Provol, San Diego, Calif.

[73] Assignee: Pyropower Corporation, San Diego, Calif.

[21] Appl. No.: 931,400

[22] Filed: Aug. 19, 1992

[51] Int. Cl.$^5$ .............................................. B01D 46/04
[52] U.S. Cl. .......................................... 95/280; 55/302
[58] Field of Search ...................................... 55/96, 302

[56] References Cited

U.S. PATENT DOCUMENTS

| Re. 24,954 | 3/1961 | Church | 183/61 |
| 4,468,240 | 8/1984 | Margraf | 55/290 |
| 4,865,627 | 9/1989 | Dewitz et al. | 55/96 |
| 5,013,341 | 5/1991 | Isaksson et al. | 55/302 |
| 5,167,676 | 12/1992 | Nakaishi et al. | 55/96 |

Primary Examiner—Tim Miles
Attorney, Agent, or Firm—Nixon & Vanderhye

[57] ABSTRACT

Filter assemblies, such as ceramic or super alloy filter tubes, for combustible gases laden with particles, are safely cleaned by providing a back pressure pulse of a clean combustible gas. The clean combustible gas, such as methane, ethane, propane, or butane, and may either be stored in an accumulator or tank as gas, or may be stored in liquid form and flashed into a gas before use. The pulsing gas may pass through a venturi, intermittent or periodic control of the valve to supply the back pressure gas through the venturi being provided. The cleaned combustible gas mixes with the clean combustible gas and passes through the filter assembly to a use station, such as a combustor where the gases are burned.

17 Claims, 2 Drawing Sheets

METHOD AND APPARTUS FOR SEPARATING PARTICULATE MATERIAL FROM COMBUSTIBLE GASES

FIELD OF THE INVENTION

The present invention relates to a method for separating particulate material from combustible gases. The present invention relates especially to the utilization of a combustible gas filtering apparatus comprising gas-permeable filter elements and means for periodically cleaning the filter elements.

BACKGROUND AND SUMMARY OF THE INVENTION

In the gasification of coal, oil, biomass, or other fossil fuels, or in other applications which utilize or produce other reactive gases under atmospheric or pressurized conditions, filtration of the generated synthetic gas is often required prior to use of the gas for combustion, chemical manufacturing, or other applications.

Modern gasification methods, especially, have resulted in a need for particle separators capable of efficiently and reliably separating particulate material from gases, usually high-temperature, high-pressure product gases. In fluidized bed gasification processes fine dust such as fine solid bed material, fly ash, unreacted fuel, and even reactive absorbent (i.e., for sulphur capture), is entrained with the exhausted high-temperature, high-pressure product gases from the gasification chamber. The solids have to be separated from the gases and are usually recirculated back into the gasification chamber.

In modern combined cycle power plants, where hot gases are expanded in gas turbines, efficient cleaning systems for the gases are essential for reliable operation of the gas turbines, since even very fine particulate matter in the gases cause severe erosion and fouling of the turbine blades.

The present-day concern with air pollution has, on the other hand, also created a demand for efficient dust collecting apparatus for increased capacity. Filtration can be used to collect entrained particles, aerosols, or other solids or liquids contained in the gases, to produce a cleaner product gas.

Different types of barrier filters are used to achieve the needed reliable separation of solid particulate matter from gases. In recent years gas permeable ceramic or super alloy filters have become a legitimate alternative to conventional separators (such as conventional baghouses, which are mainly used for cleaning gases of more moderate termpatures). Ceramic and super alloy filters make it possible to separate particulate matter from high-temperature, high-pressure combustible gases. These filter separators made of porous super alloys or ceramics can be built into substantially-compact and simple systems as they endure very high temperature conditions and do not need to be protected by cooling surfaces or refractory linings, and the filters can very easily be integrated into pressurized systems.

The use of barrier filters, ceramic filters, as well as conventional bag type filters, to remove particulates from dust-laden gases requires periodic cleaning of the filter. During operation a cake of dust will be collected on the surface of the filter media. Some of the dust particles clog the pores or gas passages of the filter, and the rest of them form a compact cake which rapidly builds up on the surface of the filter with resultant decrease in efficiency, or even blockage of the filtration action. As large amounts of dust are accumulated on the filter surface, a large pressure difference is built up between both sides of the filter and increased pressure, i.e., energy, is needed for passing the gas therethrough. The pressure drop across the filter media will increase, until the filter medium is regenerated, to remove the materials which have been collected on the filtration surface, so that the filtration process can be continued over a sustained operating period.

Conventional bag filters have been cleaned by shaking, agitating, vibrating or even brushing or scraping, thereby loosening dust layers accumulated on the filter medium. High-temperature, rigid ceramic filters, such as long, thin ceramic tube filters, may be very fragile and consequently would be damaged by such treatment.

One method for accomplishing the regeneration of filter elements is by periodically applying a brief or sustained reverse high pressure pulse of gas to the filter elements, in a reverse direction to the normal flow of gases in the filter. This reverse gas flow, or the shock wave which results from the momentary change in gas flow direction or volume, causes the dust cake to dislodge from the filter surface and allows removal of the dust from the system. This cleaning system is known as back-pulsing, reverse cleaning, or "soot blowing" of the filter.

The cleaning technique of choice for rigid ceramic filters is usually reverse cleaning or back-pulsing. During reverse cleaning the main separation process in the filter element section to be cleaned is stopped for a short period of time to let the cleaned gas flow back through the filter.

Compressed air, or high-pressure steam, are the standard substances used for back-pulsing. Filter tubes are cleaned by injecting compressed air pulses periodically into the tubes. The compressed air pulses release dust from the outer surface of the filter tubes. Each filter tube may have a compressed air injector of its own, or a common movable injector for several tubes has to be used in order to ensure cleaning of all filter tubes. U.S. Pat. No. 4,468,240 shows a filtering separator having a filter cleaning apparatus of the above-mentioned type. Attention is also directed to the pulse cleaning system of copending U.S. application Ser. No. 07/569,125 filed Aug. 17, 1990, the disclosure of which is hereby incorporated by reference herein.

When filtration is performed with fully oxidized or unreactive gases, air or steam can be very effective for back pulsing the filter. But, in applications such as the removal of particulates from reactive gases, such as combustible synthetic gas, derived from the gasification of biomass, coal, oil, or other substances, it is unsafe to use air or steam for back-pulsing of the filter. Air, especially at high temperature, can react uncontrollably and violently with the combustible gas and cause a fire or explosion. Steam could also react with the gas, and cause damage to certain ceramic materials used in filters.

It has been suggested to backwash filters by using gaseous filtrate, i.e., gas already cleaned in the filter, as the back-washing medium. In such processes the flow of dirty gas to the filter apparatus is controlled by the use of mechanical valves and the flow thereof is shut off immediately before the filtrate is forced back through the filter. Complex piping and valve systems are needed for forcing cleaned gas backwards through the system, and thus may be very hard to accomplish in a commercial environment. Considerable difficulty is experienced in connection with the mechanical valves that are required to frequently open and close the dirty gas feed lines and the filtrate lines. A great number of these valves are needed especially if different filter tubes or filter sections are back-pulsed separately and the operation of the filter system becomes very complex. Filtration methods utilizing a great number of valves could not be used in high-temperature operation, due to increased erosion and corrosion, especially not if the gas includes low melting alkaline or metal vapors.

It has also been suggested in U.S. Re. Pat. No. 24,954 to backwash rigid filters by introducing small charges of air and explosively combustible gas on the downstream side of the filter medium, thereby inducing a sharp explosion and setting up a shock wave for dislodging the filter cake accumulated on the filter medium. This is not a safe method for many environments, e.g. in a combi-cycle power plant.

The invention seeks to provide an improved method and apparatus for the filtration of combustible gases containing fine particles by minimizing the drawbacks of known filter surface cleaning systems, when cleaning combustible gases. The invention seeks to provide a safe method for cleaning filter medium used for filtration of combustible gases, and an efficient method for cleaning combustible gases which can easily be retrofitted to existing filters.

SUMMARY OF THE INVENTION

According to one aspect of the present invention, a method of cleaning combustible gas with a filter, and keeping the filter clean, is provided. The method comprises the following steps: (a) Passing, at a first pressure, combustible gas laden with particles through the filter, at least some of the gas passing through the filter to be cleaned, and particles collecting on a dirty surface of the filter, while cleaned combustible gas exits through a clean surface of the filter. (b) Periodically or intermittently forcing clean combustible gas at a second pressure, higher than the first pressure, through the filter clean surface to dislodge particles collected on the dirty surface of the filter. And, (c) combining the clean combustible gas with the cleaned combustible gas, and passing the mixture thereof toward a use station. Step (b) is practiced using a short chain hydrocarbon gas, such as methane, ethane, propane or butane.

There also may be the further step (d) of flashing a liquid (such as liquefied methane, ethane, etc.) stored under pressure into a clean, combustible gas and then practicing step (b) with the gas. Step (b) may be practiced by directing the clean combustible gas through a venturi, and then through the filter. The gas for the venturi may be supplied from a tank (e.g. accumulator) by periodically or intermittently automatically opening a valve connected between the tank and the venturi. The combined clean combustible gas and cleaned combustible gas may be burned in the use station.

The invention also comprises apparatus for filtering dirty, particle laden, combustible gas over long periods of time. The apparatus comprises: A vessel having a dirty gas inlet and a clean combustible gas outlet. A plurality of filter elements disposed in the vessel and operatively communicating on a first surface thereof with the inlet, and on a second surface thereof with the outlet. And, means for periodically or intermittently pulsing clean combustible gas through the filter elements to clean them, the pulsing means comprising a nozzle disposed in the vessel, a super-atmospheric pressure tank of clean combustible pressurized gas exterior of the vessel, and a valve between the nozzle and the tank.

The pulsing means may further comprise a venturi disposed within the vessel in operative association with the nozzle. The vessel may be vertically disposed, and if so, so is the nozzle, clean combustible gas then being discharged from the nozzle passing upwardly through the venturi. A plurality of hoppers may be disposed interiorly of the vessel below the filter elements for collecting particles separated from the dirty combustible gas. The tank may comprise an accumulator operatively connected to a compressor. The filter elements are preferably ceramic tubes or super alloy tubes.

According to the present invention, a safe method for cleaning filters is to use a gas for back-pulsing which has similar properties to the gas which is being filtered and which is easily and economically accessible. Specifically, for cleaning of filters that are being used to process combustible gases, substances such as natural gas (methane), ethane, propane, butane, liquefied petroleum gas (lpg), or other combustible gases can be used for back-pulsing. These gases will be mixed with the filtered gas during the back pulsing process, and will become a component of the product gas.

The combustible gas used for back-pulsing has to be compressed to a pressure sufficient to overcome the operating pressure in the filter and to successfully accomplish cleaning of the filter media. A storage vessel (reservoir) can be used as an accumulator to maintain an inventory of constant pressure gas. Fast-acting valves (such as ball or solenoid valves) are used to control the frequency and duration of the back-pulsing.

When, due to accumulated solid material on the filter surface, the pressure drop across the filter media reaches a level at which regeneration/cleaning is needed, the back pulse is initiated, resulting in cleaning of filter surface and a reduction in the pressure drop allowing continued operation of the filter. Back-pulse cleaning of filter media may be automatically initiated when the pressure drop over the filter media increases over a set value. The back-pulsing process is repeated, at necessary intervals, to maintain stable sustained operation of the filter.

It is an important feature of the present invention that an unconventional gas is used for back-pulsing. Air and steam are the standard substances used for this application. According to the present invention, a stable, clean combustible gas such as natural gas, or, alternatively, ethane, propane or other commercially-available, short-chain hydrocarbon gas, is used for cleaning filters used for removing particulates from combustible or reactive synthetic gas. No oxygen is added to (and no significant amount is present in) the product gas being cleaned, thereby eliminating the risk of fire or explosion in the filter or degradation of e.g. ceramic filter elements. Steam, if added to the system, is only added because it is necessary for other process purposes, and that amount of steam is not supplemented because of filter cleaning requirements.

During the back-pulsing process, the natural gas or other combustible gas used is mixed with the product gas and ultimately burned or otherwise utilized with it. Thus, the heating value of the back-pulsing gas may be recovered when the product gas is burned or utilized. Thereby, the use of combustible gas for back-pulsing becomes economical.

The back-pulsing of gas from an external accumulator into an injector in the clean gas side of a filter housing is very easily accomplished and can be simply retrofit into an already-existing filter system. The pressure of the back-pulsing gas can easily be chosen according to need and the type of combustible gas used. Separate small accumulators can easily be arranged for cleaning filter tubes in separate compartments in the filter housing if desired.

It is a primary object of the present invention to provide for the safe and effective cleaning of filters, such as ceramic and super alloy filters, for combustible gases. This and other objects of the invention will become clear from an inspection of the detailed description of the invention and from the appended claims.

DETAILED DESCRIPTION OF THE DRAWINGS

Figure 1:
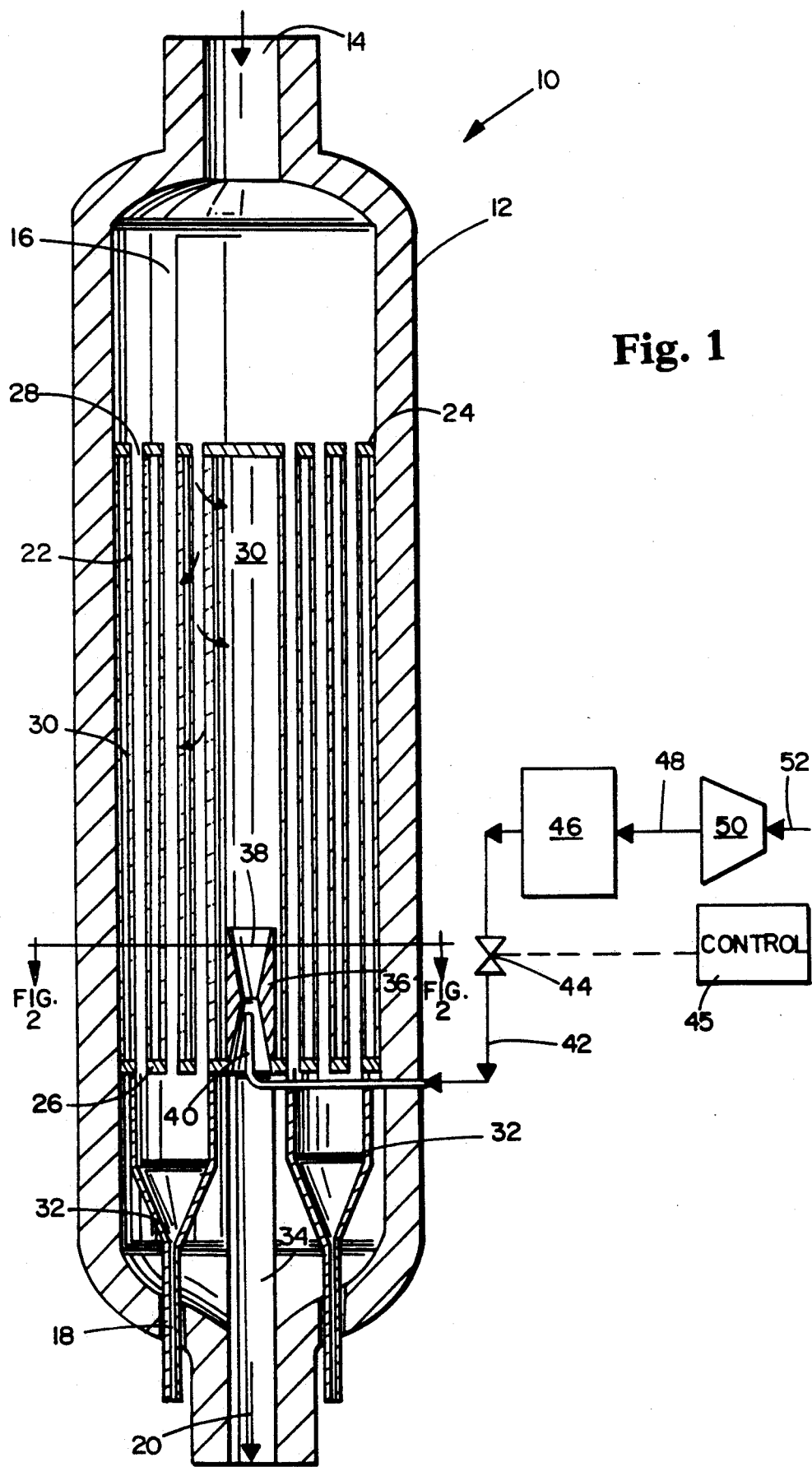
FIG. 1 shows a schematic vertical cross-sectional view of a filter assembly for cleaning combustible product gases, employing the teachings of the invention.
Figure 2:
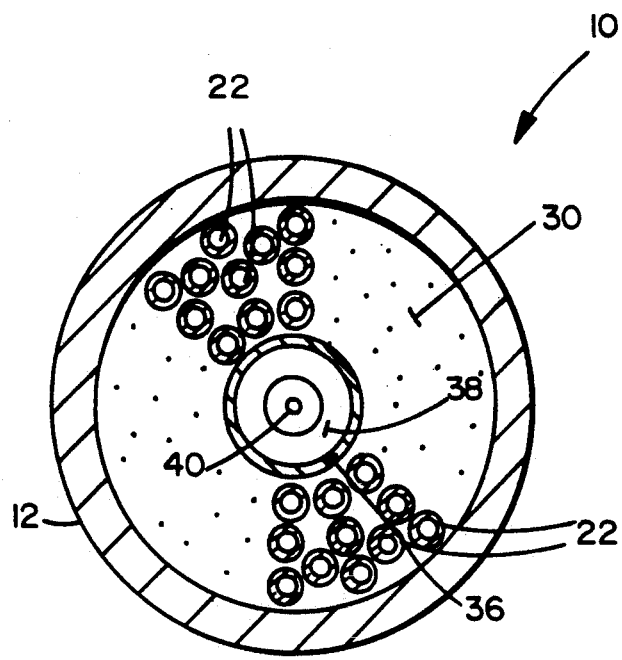
FIG. 2 is a longitudinal, schematic cross sectional view taken at the center of the filter assembly of FIG. 1, along lines 2—2 thereof.

Illustrated generally by reference numeral 10 in FIGS. 1 and 2 is a filter assembly for cleaning combustible product gas. The reactor 10 includes a main pressure vessel 12 having a dirty gas inlet 14 and a dirty gas space 16 in the upper part thereof, and a separated particles outlet 18 and a cleaned gas outlet 20 in the lower part thereof. The filters in the pressure vessel comprise a plurality of vertical, parallel, hollow tubular filter elements 22, which are porous and open at both ends thereof. The material of which the filter elements is made may comprise a ceramic material or super alloy, or a combination thereof, the filter tubes being per se well known (e.g. see copending application Ser. No. 07/569,125 filed Aug. 17, 1990).

The filter elements 22 are supported by two support plates 24 and 26. The upper ends 28 of the filter elements 22 open into the dirty gas space 16 so that the interior of the filter elements is the dirty side of the filter elements, while the clean gas outlet 20 cooperates with the clean gas space on the exterior side 30 of the filter elements.

In the lower part of the vessel an annular hopper 32, or a plurality of semi-annular hoppers 32, is/are connected to the lower open ends of the filter tubes 22. The hoppers 32 collect particulates separated from the dirty gas in the filter 10. The hoppers 32 are connected to the outlets 18 for discharging collected particles.

In the center of the lower support plate 26 a cleaned gas outlet conduit 34 is arranged to extend into the filtration chamber or clean gas side 30. The cleaned gas outlet conduit 34 is further connected to the outlet 20 for cleaned gas in the bottom of the vessel.

The inlet end of the cleaned gas outlet conduit 34 is formed as a venturi 36 having a throat portion 38. A relatively-small pipe forming a gas injector 40 is disposed in the cleaned gas outlet conduit 34 for intermittently supplying high pressure back pulse gas through the throat 38 into the clean gas side 30. The high pressure gas jet 40 causes backflow of cleaning gas through the filter elements 22.

The gas injector 40 is connected through a pipe 42 and valve 44 to an accumulator 46 containing high-pressure, combustible gas, such as natural gas. The accumulator 46 is connected through a duct 48 to a small compressor 50 for compressing cleaning gas. Gas is introduced into the compressor 50 through inlet duct 52.

In operation according to the invention, a usually-continuous flow of dirty gas, at a first pressure, is introduced into the pressure vessel 12 through inlet 14. The dirty gas flows from volume 16 into the tubular filter elements 22, whereby clean gas penetrates the porous walls of the filter elements 22 and flows into the clean gas space 30 exterior of the filter elements 22. Fine dust is separated from the dirty gas on the internal surfaces of the filter elements 22, and some of it accumulating on the surfaces, and some flowing downwards into hoppers 32 arranged in the lower part of the vessel 12. Particulates are discharged through outlets 18 from the hoppers 32.

Cleaned gas is discharged from the vessel through cleaned gas outlet conduit 34. When pressure drop over the filter increases above a certain level, which can be automatically measured, valve 44 is opened and pressurized combustible gas, such as natural gas, at a second pressure, higher than the first pressure (e.g. at least about two times as high), is intermittently injected from the accumulator 46 through gas injector 40 into the venturi area 38 of the cleaned gas outlet conduit 34. If convenient back-pulsing of gas may, of course, be introduced periodically or intermittently without any pressure drop control, under control of conventional controller 45. The injected gas causes a pulse of gas to be forwarded through the filter elements from the clean gas side to the dirty gas side, thereby loosening particles accumulated on the filter surface on the dirty gas side. The back-pulse is usually of a very short duration, e.g. 0.05–1.0 seconds (preferably about 0.3–0.5 seconds), whereafter the valve 44 is closed. The amount of gas required for cleaning is about 1–5% of the total gas stream measured on a continuous basis. More backflush is required if the product gas is very dirty, and a maximum of about 20% of the total product gas flow would be backflush gas.

The temperature of the backflush gas is not critical. It should merely be in the range where it will not damage the apparatus, or adversely affect the process.

Additional pressurized gas may be introduced into the accumulator 46 from compressor 50. When using commercial combustible gases such as ethane, propane or the like, it is possible to use already-filled gas accumulators or tanks and replace empty tanks with filled ones according to need (e.g. see tanks 54 in FIG. 3).

Both cleaned product gas and back-pulsing gas will flow through the filter elements 22 during the back-pulsing. The combustible gas used for back-pulsing is mixed with the product gas in the clean gas space 30. The mixed gas can be used with the clean product gas, e.g. burned in a gas turbine or combustor for recovering energy therefrom.

Figure 3:
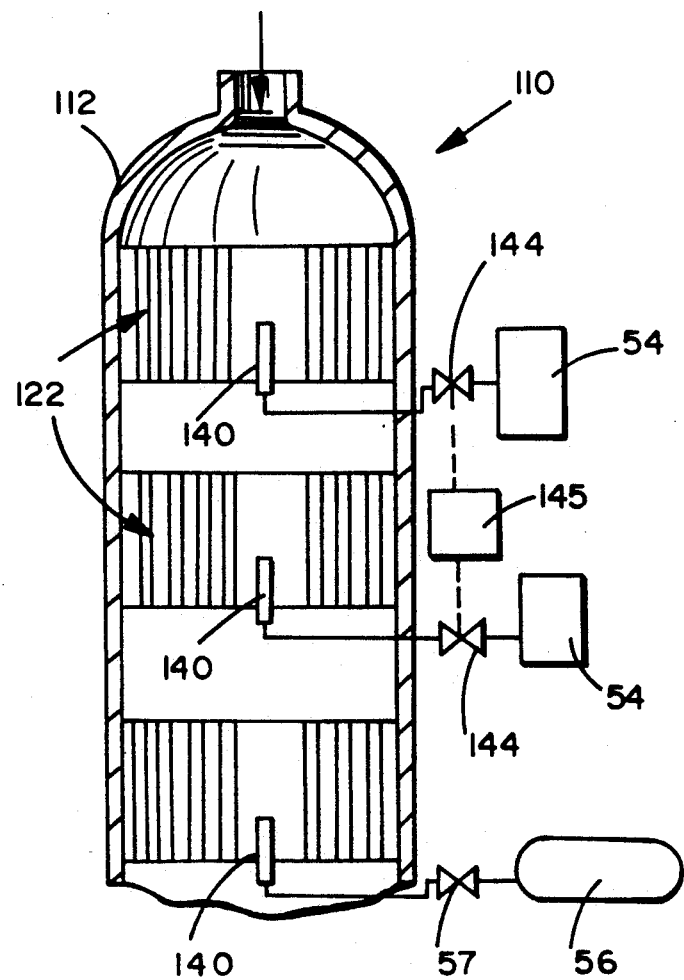
FIG. 3 is a schematic, vertical cross sectional view of a second exemplary embodiment of the filter assembly according to the present invention.

The pressure vessel 12 can, if needed, be divided by several support plates, whereby each filtration chamber and clean gas space, between adjacent support plates, has its own gas injector connected to a separate accumulator. The gas pressure in the accumulators can be varied according to need. For example, as seen for the embodiment of FIG. 3 (wherein components comparable to those of the FIGS. 1 and 2 embodiments are shown by the same reference numeral only preceded by a "1"), a plurality of vertically-spaced sets of filter elements are provided within the single vertically disposed reactor vessel 112, each having a nozzle 140 associated therewith for directing clean combustible gas initially vertically upwardly and then through the clean surfaces of the filter elements 122 to remove particles collected on the dirty surfaces of the filter elements 122. Valves 144, for example, operated by controller 145, periodically or intermittently—either automatically by time, or automatically in response to a sensed condition (such as filter back pressure), or manually—provide pulses of clean combustible gas from tanks 54. The tanks 54 may be standard bottles or like containers of combustible gas under pressure. Alternatively, the tank 56—as shown at the bottom of FIG. 3—for a liquefied combustible gas (e.g. lpg) may be connected by a valve 57 to the nozzle 140. The valve 57 and/or the nozzle 140 are designed so that they are capable of withstanding the liquefied gas from the tank 56 being flashed into gas before impacting the clean surfaces of the filter elements 122.

The invention is applicable to different types of filters, e.g. those having candle-type filter elements or those having monolithic type filter elements, or even to bag house filters.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of cleaning combustible gas with a filter, and keeping the filter clean, comprising the steps of:
   (a) passing, at a first pressure, combustible gas laden with particles through the filter, at least some of the gas passing through the filter to be cleaned, and particles collecting on a dirty surface of the filter, while cleaned combustible gas exits through a clean surface of the filter;
   (b) periodically or intermittently forcing clean combustible short chain hydrocarbon gas at a second pressure, higher than the first pressure, through the filter clean surface to dislodge particles collected on the dirty surface of the filter; and
   (c) combining the clean combustible gas with the cleaned combustible gas, and passing the mixture thereof toward a use station.

2. A method as recited in claim 1 wherein step (b) is practiced utilizing clean combustible gas selected from the group consisting essentially of methane, ethane, propane and butane.

3. A method as recited in claim 1 comprising the further step (d) of burning the combined cleaned combustible gas and clean combustible gas in the use station.

4. A method as recited in claim 1 wherein steps (a) and (b) are practiced so that the second pressure is at least about two times as great as the first pressure.

5. A method as recited in claim 1 wherein step (b) is practiced using clean combustible gas in the amount of approximately 1-20% of the volume of combustible gas laden with particles.

6. A method as recited in claim 1 wherein steps (a) and (b) are practiced by passing the combustible gas laden with particles, and the clean combustible gas, through ceramic filter tubes.

7. A method as recited in claim 1 wherein steps (a) and (b) are practiced by passing the combustible gas laden with particles, and the clean combustible gas, through super alloy filter tubes.

8. A method as recited in claim 1 comprising the further step of (d) flashing a liquid stored under pressure into a clean combustible gas, and then practicing step (b) with that gas.

9. A method as recited in claim 8 wherein step (d) is practiced by flashing into gas a liquid selected from the group consisting essentially of lpg, liquefied methane, ethane, propane and butane.

10. A method as recited in claim 1 wherein step (b) is practiced by directing clean combustible gas through a venturi, and then through the filter.

11. A method as recited in claim 10 wherein step (b) is practiced utilizing gas accumulated in a tank by periodically or intermittently automatically opening a valve connected between the tank and the venturi.

12. A method as recited in claim 11 comprising the further step of compressing clean combustible gas and then feeding it into the tank.

13. Apparatus for filtering dirty, particle laden, combustible gas over long periods of time, comprising: a main vessel having a dirty gas inlet and a cleaned combustible gas outlet; a plurality of filter elements disposed in said vessel and operatively communicating on a first surface thereof with said inlet, and on a second surface thereof with said outlet; and means for periodically or intermittently pulsing clean combustible gas through said filter elements to clean them;
   said pulsing means comprising a nozzle disposed in said vessel, a super-atmospheric pressure holding vessel of clean liquefied combustible pressurized gas exterior of said vessel, a valve between said nozzle and said holding vessel; and
   means for flashing the liquefied gas into gas prior to passage through said filter elements.

14. Apparatus as recited in claim 13 wherein said filter elements are selected from the group consisting of ceramic tubes and super alloy tubes.

15. Apparatus as recited in claim 13 wherein said pulsing means further comprises a venturi disposed within said vessel in operative association with said nozzle.

16. Apparatus as recited in claim 15 wherein said main vessel is vertically disposed, and wherein said nozzle is also vertically disposed, clean combustible gas being discharged from said nozzle initially passing upwardly through said venturi.

17. Apparatus as recited in claim 16 further comprising a plurality of hoppers disposed interiorly of said vessel below said filter elements, for collecting particles separated from the dirty combustible gas.

* * * * *